(12) United States Patent
Berke et al.

(10) Patent No.: US 6,273,467 B1
(45) Date of Patent: Aug. 14, 2001

(54) RESTRAINT SYSTEM SURGICAL SHIELD

(75) Inventors: Joseph J. Berke, 3248 Interlaken, West Bloomfield, MI (US) 48323; Charles T. Michael, Troy, MI (US)

(73) Assignee: Joseph J. Berke, West Bloomfield, MI (US)

( * ) Notice: Subject to any disclaimer, the term of this patent is extended or adjusted under 35 U.S.C. 154(b) by 0 days.

(21) Appl. No.: 09/503,470

(22) Filed: Feb. 14, 2000

(51) Int. Cl.$^7$ .................................................. B60R 21/02
(52) U.S. Cl. ........................... 280/751; 280/808; 297/482
(58) Field of Search ................................. 297/482, 487, 297/488; 280/748, 751, 801.1, 808

(56) References Cited

U.S. PATENT DOCUMENTS

| 2,551,255 | * | 5/1951 | Engel . | |
| 4,741,574 | * | 5/1988 | Weightman et al. | 297/482 |
| 5,322,349 | * | 6/1994 | Gianino | 297/482 |
| 5,584,536 | * | 12/1996 | White | 297/482 |
| 5,620,234 | * | 4/1997 | Gunby | 297/482 |
| 5,664,843 | * | 9/1997 | Gleason | 297/471 |
| 5,795,030 | * | 8/1998 | Becker | 297/488 |
| 5,911,479 | * | 6/1999 | Atkinson | 297/482 |
| 6,017,094 | * | 1/2000 | Syiek | 297/482 |

FOREIGN PATENT DOCUMENTS 2 624 458 * 12/1987 (FR) .

* cited by examiner

*Primary Examiner*—Paul N. Dickson
(74) *Attorney, Agent, or Firm*—Alex Rhodes

(57) ABSTRACT

A restraint system surgical shield for preventing rubbing of a restraint system belt on a sensitive or physically impaired body area such as a heart pacer, chemotherapy port, defibrillator, scars, chest injuries, skin rashes, and pregnancies. In a first aspect of the invention a portion of a restraint system belt is spaced away from a sensitive or physically impaired body area by a bracket which is attached to the belt and is supported on an annular pad. In a second aspect, a portion of a belt is spaced away from the body area by a pair of pads which are attached to the belt. In a third aspect, an extended portion of a belt is spaced away from the body area by a band which is attached to a pair of pads.

20 Claims, 5 Drawing Sheets

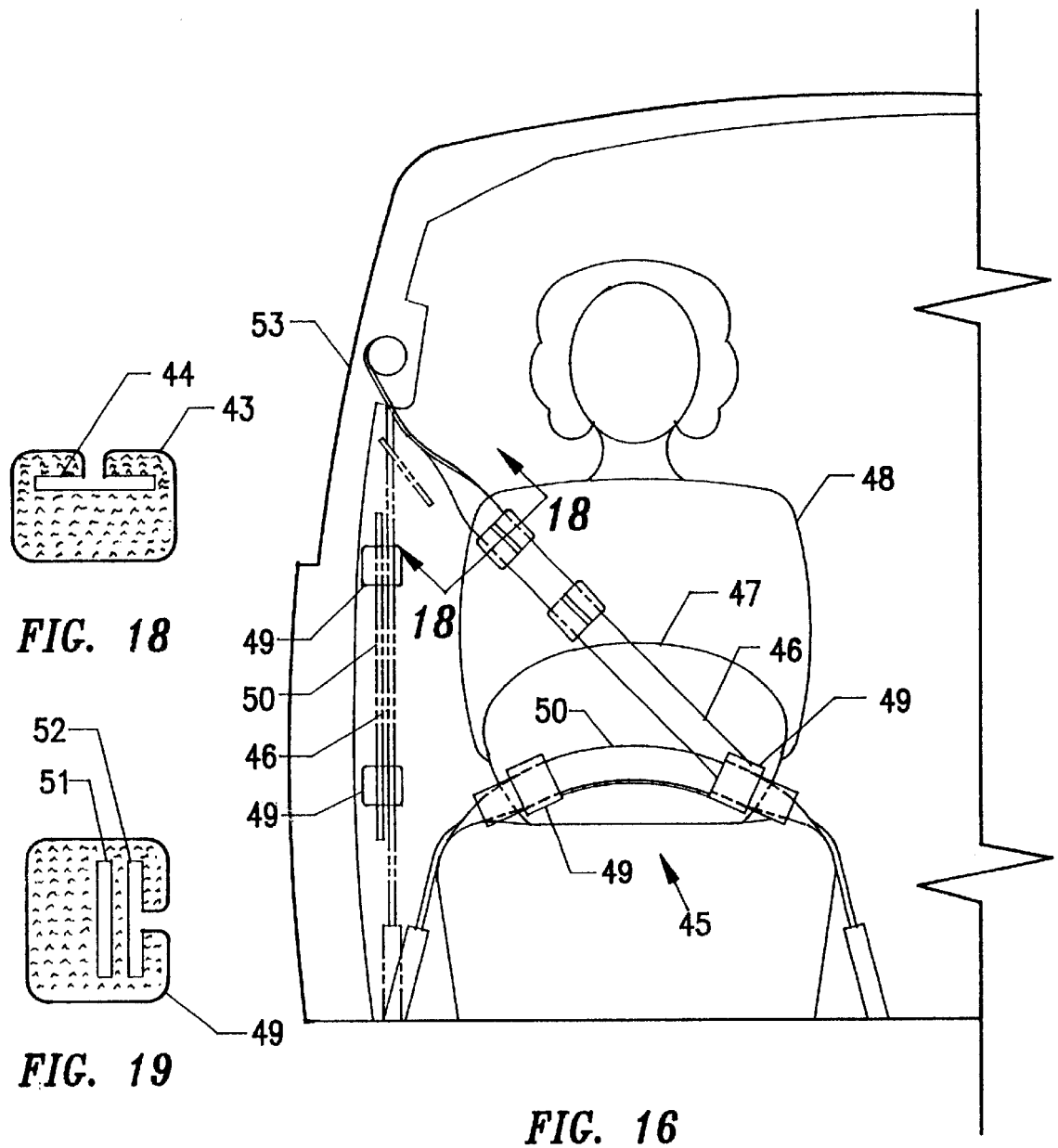
FIG. 18
FIG. 19
FIG. 16
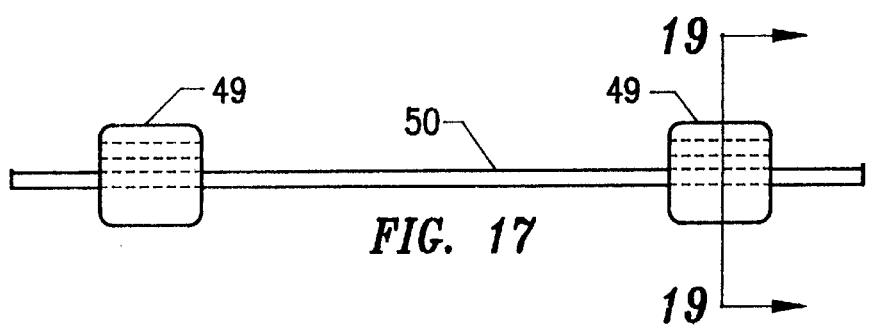
FIG. 17

RESTRAINT SYSTEM SURGICAL SHIELD

FIELD OF THE INVENTION

This invention relates to personal body shields and more particularly to a protective shield for reducing rubbing of a vehicle restraint system belt upon a sensitive or physically impaired body area.

BACKGROUND OF THE INVENTION

The safety benefits of a vehicle restraint system belt are well known and undisputed. Most states require drivers and occupants to wear shoulder and lap belts. Although there has been a substantial increase in belt usage, many physically disadvantaged drivers and passengers refuse or are unable to wear belts because of pain and discomfort. Tender body areas are irritated by the restraint system belt rubbing on implants, such as heart pacers, chemotherapy ports, and defibrillators or sensitive body areas, including mastectomy scars, thoracotomy scars, appendectomy scars, laparotomy scars, chest injuries, skin rashes, and pregnancies. Areas with bandages and medications have also discouraged drivers and passengers from using restraint system belts.

SUMMARY OF THE INVENTION

The present invention completely overcomes the objections of physically disadvantaged persons to wearing restraint system belts. The invention resides in the ability of applicants' protective shield to eliminate or reduce rubbing of a restraint system belt on a sensitive or physically impaired body area by spacing the belt away from the sensitive or physically impaired body area. One further benefit is that the invention does not require changes to current restraint systems. Another benefit is that it is easy to use. A still further benefit is that it is applicable to both seat and shoulder belts. A still further benefit is that it has little, if any, effect on restraint system effectiveness.

In a first embodiment of the invention, a resilient annular pad is joined to a thin flat bracket. The thin bracket has a pair of slotted apertures for attaching the protective shield to a lap or shoulder belt. In the installed condition, the lap or shoulder belt rests on the top of the bracket. The location of the protective shield on the belt is adjustable to position the shield opposite the sensitive or physically impaired body area.

In a second embodiment of the invention, a second pair of slots are provided in a shield of similar construction to the first embodiment for rotating the shield 90 degrees on the belt.

In a third embodiment of the invention, a thin unitary single piece shield has an elongated center portion for supporting a portion of a belt and slotted downward extending opposite end portions for retaining the shield on the belt and spacing the belt away from a sensitive or physically impaired body area.

In a fourth embodiment of the invention, the length of the elongated center portion of the second embodiment is selectively adjustable.

In a fifth embodiment of the invention, a sensitive or impaired body area is shielded by a pair of pads which space a portion of the belt away from the concerned body area.

In a sixth embodiment of the invention, the spaced apart pads of the fourth embodiment are connected by a thin narrow resilient band to space an extended portion of a restraint system belt away from a large sensitive or physically impaired body area such as the abdominal region of a pregnant woman.

Further objects, benefits and features of the invention will become apparent from the ensuing detailed description and drawings which illustrate and describe the invention. The best mode which is contemplated in practicing the invention together with the manner of using the invention are disclosed and the property in which exclusive rights are claimed is set forth in each of a series of numbered claims at the conclusion of the detailed description:

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

FIG. 16 is a front view of a person restrained by a shoulder belt with a sixth alternate embodiment of the protective pad.

FIG. 17 is an enlarged right side view of the sixth alternate embodiment.

FIG. 18 is an enlarged cross-sectional view taken on the line 18—18 in FIG. 16.

FIG. 19 is an enlarged cross-sectional view taken on the line 19—19 in FIG. 17.

DETAILED DESCRIPTION OF A PREFERRED EMBODIMENT

Figure 1:
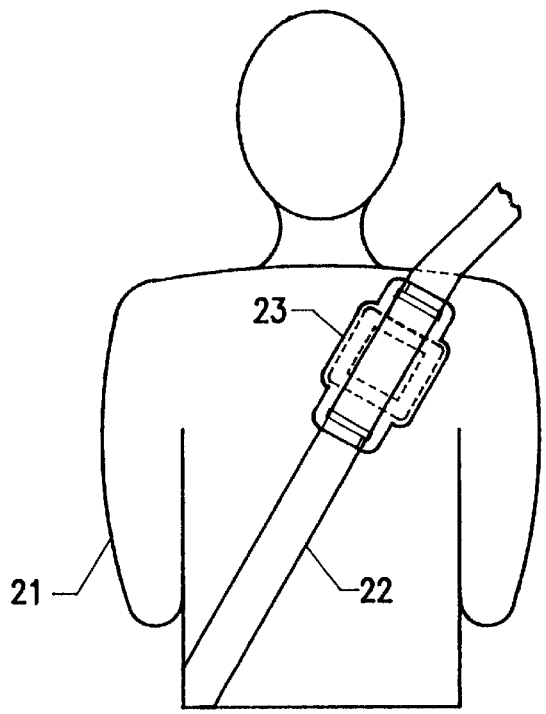
FIG. 1 is a front view of a person restrained by a shoulder belt with a protective shield according to our invention.
Figures 2, 3, 4:
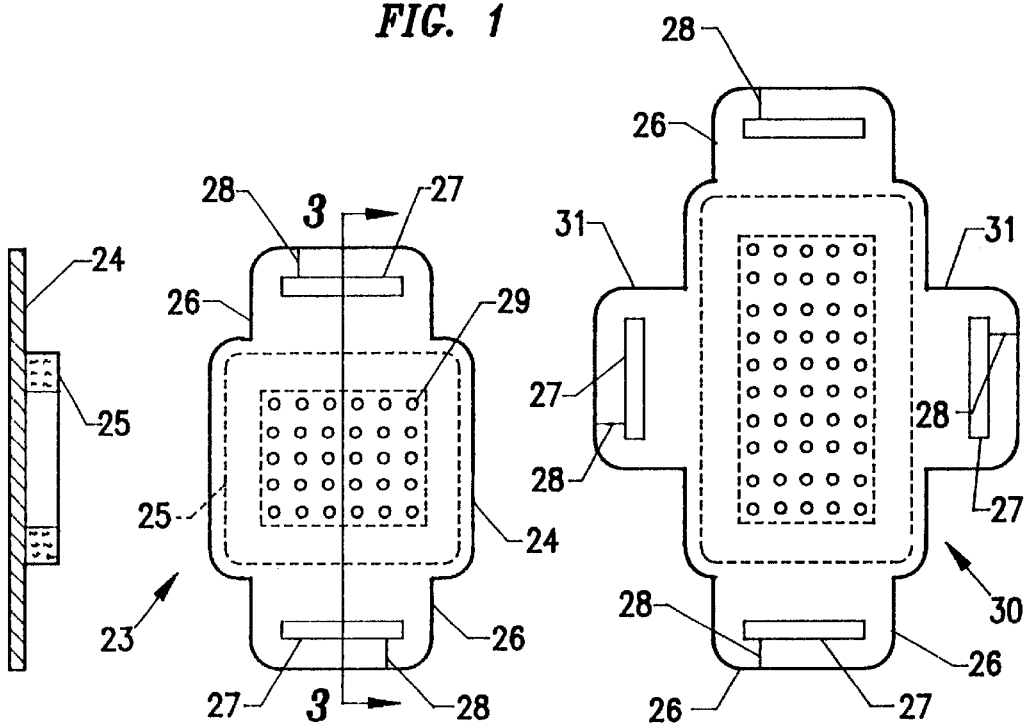
FIG. 2 is an enlarged front view of the protective pad.
FIG. 3 is an enlarged cross-sectional view taken on the line 3—3 in FIG. 2.
FIG. 4 is an enlarged front view of a second alternate embodiment of the protective pad.

Refer now to the drawings wherein like numerals designate like and corresponding parts throughout the several views. In FIG. 1, a person 21 is shown wearing a shoulder belt 22 with a protective shield 23 according to our invention. The protective shield 23, as shown in enlarged form in FIGS. 2 and 3, is comprised of a thin flat bracket 24 and an annular cellular foam pad 25 between the shoulder belt 22 and the bracket 24. The annular pad 25 is attached to the bracket 24. The thin bracket 24 has a pair of opposite outward extending tabs 26, each with a slotted aperture 27 for attaching and positioning the shield 23 on the shoulder belt 22. The outer portions of the tabs 26 have cut portions 28 to install the shield 23 on the belt 22. Apertures 29 extend through the bracket 24 for ventilating the sensitive or physically impaired body area.

When the shield 23 is properly positioned, a portion of the belt 22 is spaced away from the sensitive or impaired body area with the pad's open center portion opposite the sensitive or physically impaired body area. Thus, rubbing or contact of the belt 22 with the concerned body area is reduced or eliminated. It will be appreciated that the pad 25 need not be resilient nor cellular since air filled or rigid pads can serve a similar purpose.

In FIG. 4 an alternate embodiment 30 is shown of similar construction to the FIGS. 1 through 3 embodiment 23, except that a second pair of slotted tabs 31 have been added at 90 degrees to the first pair 26. The second pair of slotted tabs 31 allow the shield 30 to be mounted at optional orientations on the belt 22.

Figure 5:
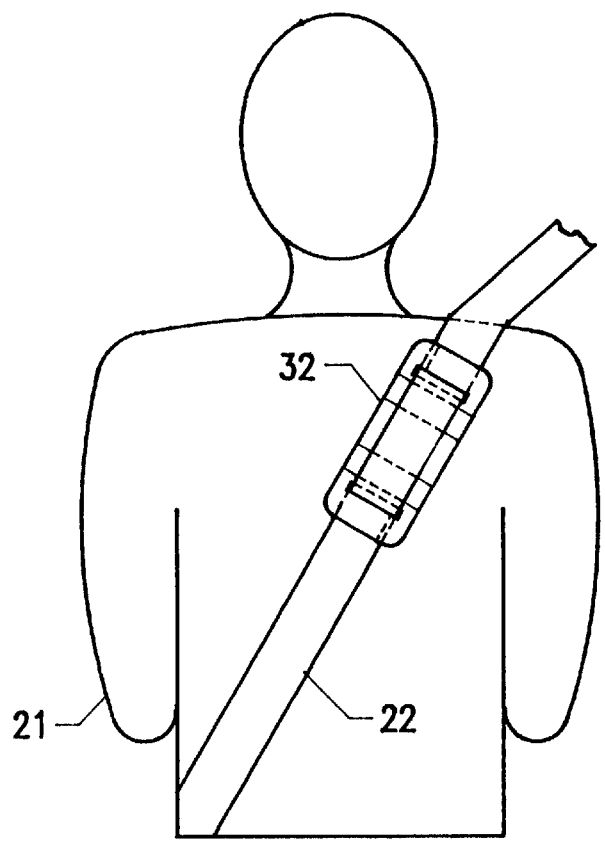
FIG. 5 is a front view of a person restrained by a shoulder belt with a third alternate embodiment of the protective pad.
Figure 6:
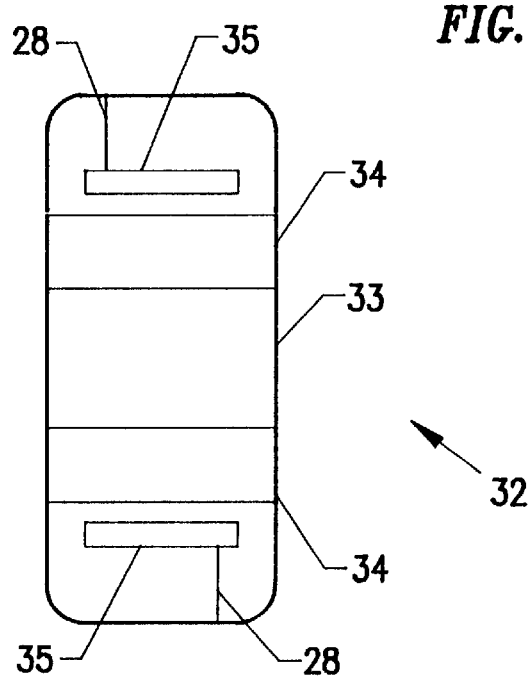
FIG. 6 is an enlarged front view of the third alternate embodiment.
Figure 7:
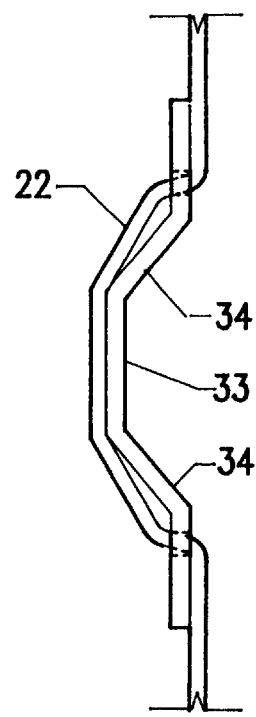
FIG. 7 is an enlarged left side view of the third alternate embodiment.
Figure 8:
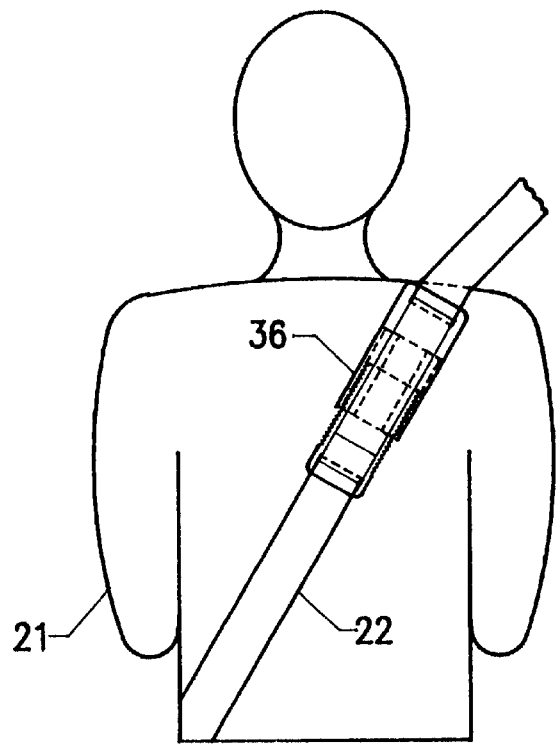
FIG. 8 is a front view of a person restrained by a shoulder belt with a fourth alternate embodiment of the protective pad.
Figure 9:
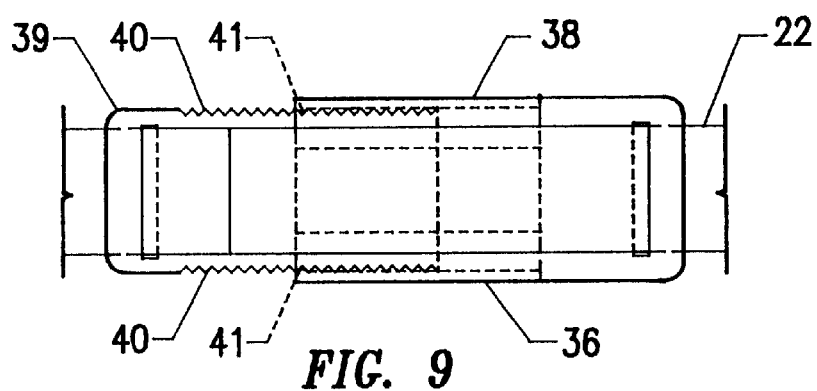
FIG. 9 is an enlarged front view of the fourth alternate embodiment.
Figure 10:
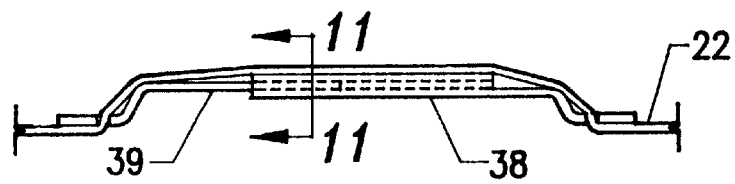
FIG. 10 is an enlarged left side view of the fourth alternate embodiment.
Figure 11:
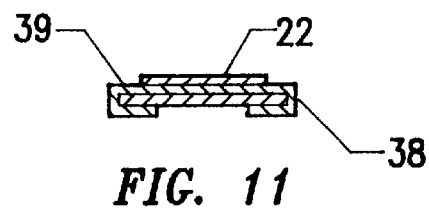
FIG. 11 is an enlarged cross-sectional view taken on the line 11—11 in FIG. 10.
Figure 12:
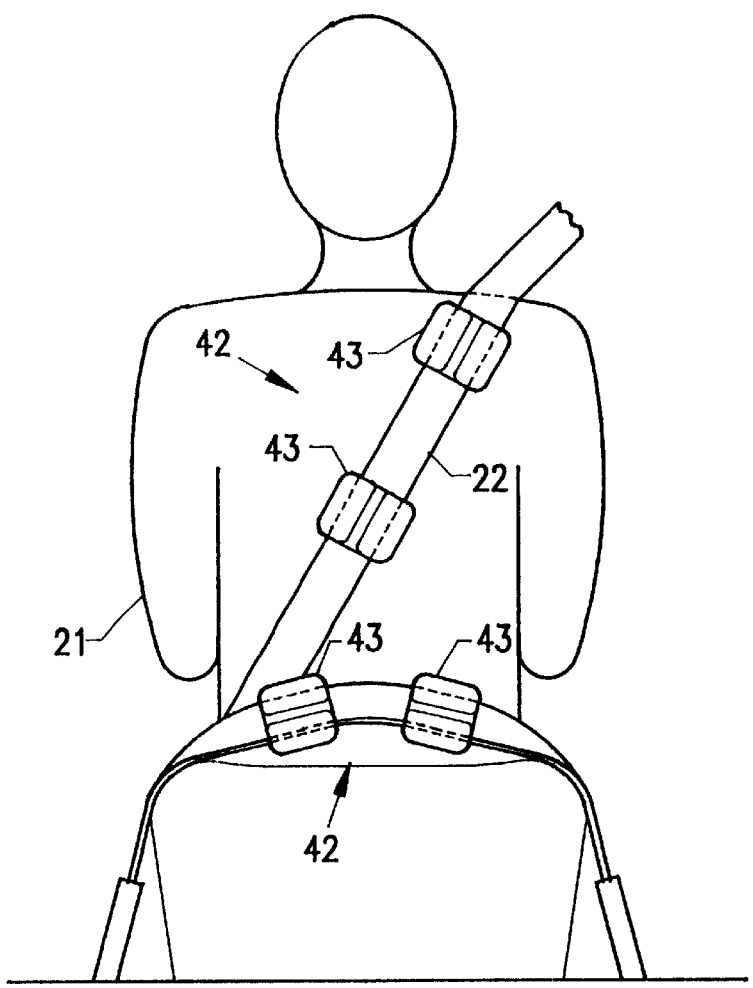
FIG. 12 is a front view of a person restrained by a shoulder belt with a fifth alternate embodiment of the protective pad.
Figure 15:
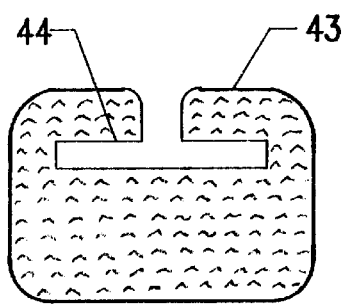
FIG. 15 is an enlarged cross-sectional view taken on the line 15—15 in FIG. 13.
Figure 14:
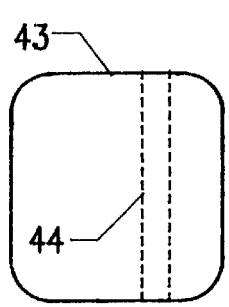
FIG. 14 is an enlarged right side view of the fifth alternate embodiment.
Figure 13:
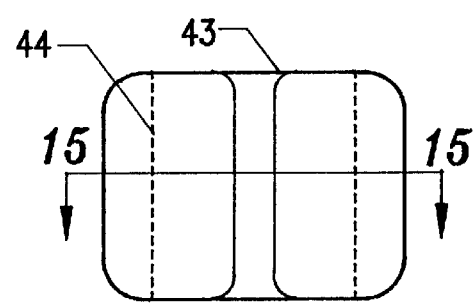
FIG. 13 is an enlarged front view of the fifth alternate embodiment.

Referring now to FIGS. 5 through 7, inclusive, an embodiment 32 is shown which is a thin unitary single piece shield 32 with an elongated center portion 33 for supporting a portion of the restraint system belt 22 and opposite end portions 34 with slots 35 for retaining the shield 32 on the belt 22 and spacing the belt 22 away from a sensitive or physically impaired body area.

In FIGS. 8 through 11, inclusive, an embodiment 36 is shown which is similar to the FIGS. 5 through 7 embodiment 32, except that the length of its center portion 37 is selectively adjustable by a user to cover smaller or larger sensitive or physically impaired body areas. The adjustment of the center portion 37 is achieved by dividing the center portion 37 into two parts, i.e, a channel cross-section member 38 and the other an engaging flat cross-section member 39. Rows of serrations 40 in the sides of the flat cross-section member 39 engage inward extending projections 41 of the channel cross-section member 38 to maintain a selected length of the shield 36.

In FIGS. 12 through 15, an embodiment 42 is shown wherein a sensitive or physically impaired body area is shielded by a pair of resilient cellular pads 43 which space a portion of the restraint system belt 22 away from a sensitive or physically impaired body area. Each of the pads 43 has a slot 44 for engaging the restraint system belt 22. The location of each of the pads 43 on the restraint system belt 22 is selectively adjustable to position a portion of the belt 22 away from the affected area.

In FIGS. 16 through 19, inclusive, an embodiment 45 is shown for preventing or reducing a rubbing of a three point anchored seat and shoulder belt 46 on an abdominal area 47 of a pregnant woman 48. The shield 45 for the abdominal area 47 is comprised of a pair of slotted cellular pads 49 which are interconnected with a thin narrow resilient band 50. The resilient band 50 has a stiffness which is sufficient to prevent the force of a belt retracting system from straightening the band 50 when the belt 46 is worn. A stiff preformed arcuate band (not shown) can be used in lieu of the resilient band 50. Each of the pads 49 has a pair of slots, one 51 for attaching the resilient band 50 to the pad 49 and another 52 for attaching the belt 46 to the pad 49.

In FIG. 17, the pads 49 and band 50 are shown with the shield 45 in a free condition without the belt 46. In FIG. 16, the pads 49 and band 50 are shown in an operative condition with the seat belt 46 worn and in phantom in an inoperative condition when the belt 46 is not in use. In the inoperative condition, the shield 45 is stored adjacent to the restraint system belt 46 which is retracted into a vehicle lock pillar 53. In the operative condition, the cellular pads 49 are preferably located on the belt 46 to concentrate belt loads on or near the woman's hips. The resilient band 50 and pads 49 space the seat belt away from the woman's abdomen.

From the foregoing, it will be understood that our invention provides a means for a physically disadvantaged person to wear restraint system belts without discomfort. Moreover, it will encourage the use of restraint system belts with resulting decreases in vehicle injuries and deaths.

Although only several embodiments of our invention have been illustrated and discussed, it is not our intention to limit our invention to these embodiments, since other embodiments can be developed from our disclosure by such changes as part substitution and changes in size, shape, and material alterations without departing from the spirit thereof.

We claim:

1. A shield for reducing rubbing of a vehicle restraint system belt upon a sensitive or physically impaired body area comprising: a means for shielding a sensitive or physically impaired body area of a person wearing a vehicle restraint system belt by spacing a portion of said restraint system belt away from said sensitive or physically impaired body area, wherein said means for shielding said sensitive or physically impaired body area comprises a thin flat bracket for supporting said portion of said belt and an annular pad joined to said bracket for spacing said portion of said belt away from said sensitive or physically impaired body area; and a means for attaching said shield to said restraint system belt.

2. The shield recited in claim 1 wherein said annular pad is a resilient cellular pad.

3. The shield recited in claim 1 wherein said means for attaching said bracket to said belt are a pair of opposite outward extending slotted end portions of said bracket for engaging said belt.

4. The shield recited in claim 3 further comprising a second pair of opposite outward extending slotted end portions of said bracket, said second pair being in orthogonal relationship to said other pair.

5. A shield for reducing rubbing of a vehicle restraint system belt upon a sensitive or physically impaired body area comprising: a means for shielding a sensitive or physically impaired body area of a person wearing a vehicle restraint system belt by spacing a portion of said restraint system belt away from said sensitive or physically impaired body area, wherein said means for shielding said sensitive or physically impaired body area comprises a thin unitary single piece bracket, said bracket having an elongated center portion for supporting said portion of said belt; a a pair of opposite downward extending end portions for spacing said center portion away from said sensitive or physically impaired body area of a person wearing said belt; a slotted aperture in each of said downward extending end portions for engaging said belt; and a means for attaching said shield to said restraint system belt.

6. The shield recited in claim 5 wherein said elongation of said center portion has a length which is selectively adjustable.

7. A shield for reducing rubbing of a vehicle restraint system belt upon a sensitive or physically impaired body area comprising: a means for shielding a sensitive or physically impaired body area of a person wearing a vehicle restraint system belt by spacing a portion of said restraint system belt away from said sensitive or physically impaired body area, wherein said means for shielding said sensitive or physically impaired body area comprises a pair of spaced apart pads, each of said pads having a slotted portion for engaging and spacing said portion of said belt away from said sensitive or physically impaired body area; and a means for attaching said shield to said restraint system belt.

8. The shield recited in claim 7 wherein the position of at least one of said pads on said belt is selectively adjustable.

9. The shield recited in claim 7 wherein said shield is for spacing a portion of a shoulder belt away from said sensitive or physically impaired body area.

10. The shield recited in claim 7 wherein said shield is for spacing a portion of a seat belt away from said sensitive or physically impaired body area.

11. The shield recited in claim 7 further comprising an elongated band and a second slot in each of said pads for engaging end portions of said band to space an extensive portion of a belt away from said sensitive or physically impaired body area.

12. The shield recited in claim 11 wherein said band is a resilient flat band.

13. The shield recited in claim 11 wherein said band is a rigid pre-formed arcuate band.

14. A shield for reducing rubbing of a vehicle restraint system belt on a sensitive or physically impaired body area comprising: a bracket for supporting a portion of a restraint system belt away from a sensitive or physically impaired body area of a person wearing said belt; and a resilient annular pad attached to said bracket for said spacing of said portion of said bracket away from said sensitive or physically impaired body area.

15. A shield for reducing rubbing of a vehicle restraint system belt on a sensitive or physically impaired body area comprising: at least one pair of spaced apart pads for supporting a portion of a restraint system belt away from a sensitive or physically impaired body area of a person wearing said belt; an elongated narrow resilient band, said band having end portions attached to said spaced apart pads; a means for attaching said end portions of said band to said spaced apart pads; and a means for attaching end portions of said portion of said band between said belt and said sensitive or physically impaired body area.

16. A method for reducing rubbing of a restraint system belt on a sensitive or physically impaired body area of a wearer of said restraint system belt comprising the steps of: determining the extent of a portion of said restraint system belt which rubs on said sensitive or physically impaired body area; and spacing apart said portion of said belt away from said sensitive or physically impaired body area.

17. The method recited in claim 16 wherein said step of spacing said portion of said belt away from said sensitive or physically impaired body area is comprised of the steps of attaching a shield to said portion of said restraint system belt, said shield having a bracket for supporting said portion of said belt and an annular pad attached to said bracket between said bracket for spacing said bracket away from said sensitive or physically impaired body area.

18. The method recited in claim 16 wherein said step of spacing away said portion of said belt is comprised of the steps of attaching a pair of pads between said portion of said belt and said sensitive or physically impaired body area; and adjusting at least one of said pads on said restraint system belt to position said portion of said belt away from said sensitive or physically impaired body area.

19. The method recited in claim 16 wherein said step of spacing away said portion of said belt is comprised of the steps of attaching a spaced apart pair of pads which are joined to end portions of an elongated narrow resilient band between said belt and said sensitive or physically impaired body area; and adjusting the location of said pads and said band on said belt to position said portion of said belt away from said sensitive or physically impaired body area.

20. The method recited in claim 16 wherein said belt is a three point anchored belt in a retracted condition comprising the further step of storing said shield on said belt.

* * * * *